C. G. DIETSCH.
SPRINKLING NOZZLE.
APPLICATION FILED JAN. 29, 1914.
1,151,089.
Patented Aug. 24, 1915.
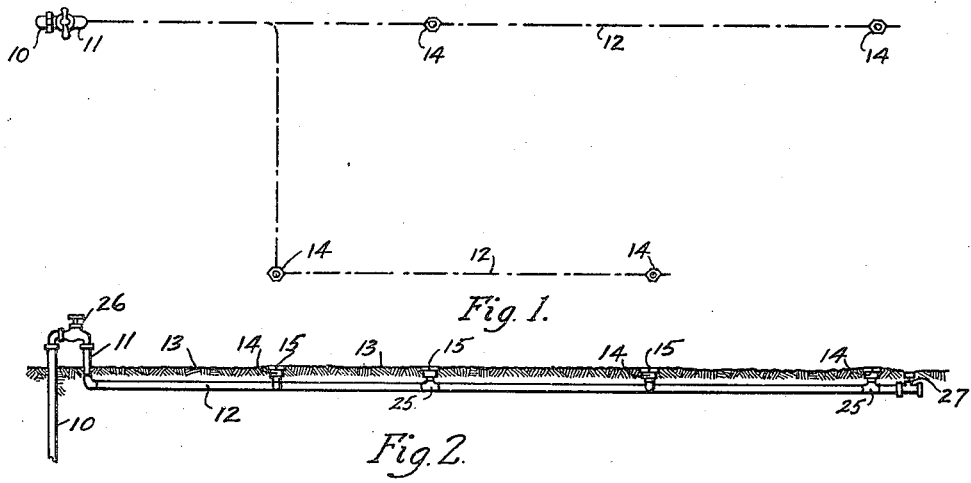
Fig. 1.
Fig. 2.
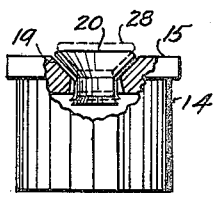
Fig. 3.
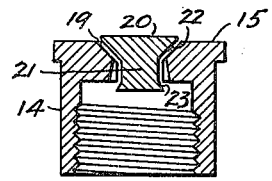
Fig. 5.
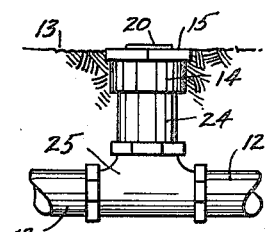
Fig. 6.
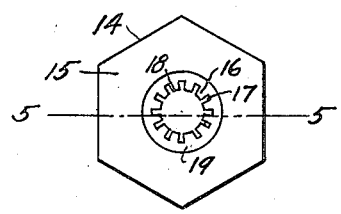
Fig. 4.
WITNESSES.
E. L. Westfall
Chas. A. Aten
INVENTOR.
Charles G. Dietsch
BY
L. L. Westfall
ATTORNEY.

_UNITED STATES PATENT OFFICE._

CHARLES G. DIETSCH, OF SPOKANE, WASHINGTON.

SPRINKLING-NOZZLE.

1,151,089.        Specification of Letters Patent.        Patented Aug. 24, 1915.

Application filed January 29, 1914. Serial No. 815,318.

*To all whom it may concern:*

Be it known that I, CHARLES G. DIETSCH, a citizen of the United States of America, residing at Spokane, in the county of Spokane and State of Washington, have invented certain new and useful Improvements in Sprinkling-Nozzles, of which the following is a specification.

This invention pertains to sprinkling nozzles and has for its object to provide a nozzle especially designed for use in connection with a sprinkling system to be installed in connection with a lawn that is required to be watered by artificial means.

The nozzle will be hereinafter particularly described and illustrated in the drawings in connection with a sprinkling system.

In the accompanying drawings forming a part of this specification Figure 1 is a plan view of a sprinkling system embodying my invention, Fig. 2, is a side elevation of the same, Fig. 3, is a broken-away side elevation of one of the spraying nozzles, Fig. 4, is a top plan view of one of the nozzles, Fig. 5, is a vertical sectional view of one of the nozzles taken on the line 5—5 of Fig. 4, and Fig. 6, is an elevation of a broken-away portion of the pipe line to which is connected a portion having an upwardly projecting conduit to which the nozzle is attached.

In a detail description of the mechanism in which like parts are referred to by like numerals throughout the several views, an ordinary water supply pipe 10 is connected, as at 11, with a horizontally disposed distributing pipe 12 set a short distance beneath the surface of the earth 13. The nozzles 14 are connected with and reach upwardly from the distributing pipe 12 their top portions 15 being on a level with the surface of the earth 13.

Centrally disposed in the top 15 of the nozzles 14 are openings 16. Vertical flutes 17 are provided in the wall 18 surrounding the opening 16. The openings 16 are beveled at 19 as shown in Figs. 3 and 5, and plugs 20 are made to snugly fit the openings 16, the same having vertically arranged portions 21 and beveled portions 22. Flanges 23 at the base of the plugs 22 prevent them from passing through the openings 16 and becoming separated from the nozzles 14. The larger portion of the plugs 20 extends over and covers the fluting 17.

The nozzles 14 may be connected to the pipe 12 direct or attached to tubular conduits 24 which in turn are connected with the pipe 12 or to inserts 25 joined to the pipe 12 as shown in Fig. 6.

A cut-off valve 26 is located between the water supply pipe 10 and the connection 11 leading to the distributing pipe 12. The distributing pipe 12 should be set at a slight angle as shown in Fig. 2 with a drain cock 27 stationed at its lowest point in order that the water may be drained from the pipe 12, to prevent damage to the pipe from freezing, etc.

When the valve 26 is opened and water allowed to run into the distributing pipe 12, the same passes upwardly through the conduits 24 and into the nozzles 14, striking against the bottoms of the plugs 20 forcing the same upwardly to the position shown by the dotted lines 28 in Fig. 3. When the valve is cut-off and the water recedes from the plugs 20, the plugs fall by gravity to the position shown in Figs. 5 and 6, thus covering the openings 16 as well as the vertical fluting 17 preventing dirt or other substance getting into the pipe 12 and leaving an unobstructed path for a lawn mower.

As shown in the drawings the fluting 17 completely encircles the openings 16, consequently water will be sprayed on all sides of the nozzles 16, but when desired, the fluting 17 may be provided only part way around the openings 16 thereby limiting the spraying field to what is desired.

The snug fit of the plugs 20 in the openings 16 prevents the flow of water only through the fluting 17.

While I have illustrated the use of the nozzle in connection with a particularly described sprinkling system, it is understood that it is the nozzle upon which I claim protection and which may be used in connection with any suitable means for sprinkling or spraying.

What I claim is,

A nozzle having an opening therein, the wall surrounding such opening being beveled at the upper portion thereof and vertical at the bottom portion thereof, such vertical portion having fluting therein, a plug in said opening adapted to fit the same and having a portion extending over and covering said fluting, together with a flange at the base of said plug adapted to engage the wall of said opening at the base thereof to prevent the separation of the plug and the nozzle.

In testimony whereof I affix my signature in presence of two witnesses.

CHARLES G. DIETSCH.

Witnesses:
E. L. WESTFALL,
WARREN BELT.